(12) United States Patent
Gandhi et al.

(10) Patent No.: US 11,632,062 B2
(45) Date of Patent: Apr. 18, 2023

(54) ELECTROSTATICALLY ROTATABLE GEAR AND GEAR SET

(71) Applicant: Toyota Motor Engineering & Manufacturing North America, Inc., Plano, TX (US)

(72) Inventors: Umesh N. Gandhi, Farmington Hills, MI (US); Ryohei Tsuruta, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 495 days.

(21) Appl. No.: 16/751,847

(22) Filed: Jan. 24, 2020

(65) Prior Publication Data

US 2021/0234477 A1    Jul. 29, 2021

(51) Int. Cl.
  *H02N 1/00*   (2006.01)
  *H05F 3/00*   (2006.01)
  *F16H 1/00*   (2006.01)
  *F16H 57/00*  (2012.01)

(52) U.S. Cl.
  CPC ............ *H02N 1/004* (2013.01); *F16H 1/003* (2013.01); *H05F 3/00* (2013.01); *F16H 2057/0056* (2013.01)

(58) Field of Classification Search
  CPC ................................ H02N 1/004; F16H 55/06
  USPC .................. 74/411.5, DIG. 4, 457; 310/40 R
  See application file for complete search history.

(56) References Cited

U.S. PATENT DOCUMENTS

| | | | |
|---|---|---|---|
| 3,107,326 A | 10/1963 | Denholm | |
| 3,629,624 A | 12/1971 | Staudte | |
| 4,858,044 A | 8/1989 | Crapo | |
| 4,943,750 A | 7/1990 | Howe et al. | |
| 5,013,954 A | 5/1991 | Shibaike et al. | |
| 5,493,156 A * | 2/1996 | Okada | H02N 1/004 310/40 MM |
| 5,771,745 A * | 6/1998 | Goette | F16H 57/0006 74/440 |
| 5,793,144 A | 8/1998 | Kusase et al. | |
| 5,959,376 A | 9/1999 | Allen | |
| 6,064,027 A | 5/2000 | Santi | |
| 6,313,562 B1 | 11/2001 | Barnes et al. | |
| 7,365,463 B2 * | 4/2008 | Horst | H02K 99/20 310/120 |
| 7,899,366 B2 | 3/2011 | Tanaka | |
| 10,267,718 B2 * | 4/2019 | Johnson | G01N 3/56 |
| 2002/0167231 A1 | 11/2002 | Horng et al. | |
| 2004/0189120 A1 | 9/2004 | Takashima et al. | |
| 2008/0122307 A1 | 5/2008 | Campbell | |
| 2011/0113908 A1 * | 5/2011 | Corradini | F16H 49/005 74/DIG. 9 |
| 2011/0138951 A1 * | 6/2011 | Mashue | F16H 55/17 74/640 |

* cited by examiner

FOREIGN PATENT DOCUMENTS

CN          101114777 A      1/2008

*Primary Examiner* — Jake Cook
(74) *Attorney, Agent, or Firm* — Christopher G. Darrow; Darrow Mustafa PC (57) ABSTRACT

A gear includes at least one gear tooth and an electrode mounted to the at least one gear tooth along a contact face of the at least one gear tooth. A flowable dielectric material is positioned on the contact face of the at least one gear tooth. The dielectric material is structured to be movable along the contact face of the at least one gear tooth responsive to a gravity force.

9 Claims, 6 Drawing Sheets

ELECTROSTATICALLY ROTATABLE GEAR AND GEAR SET

TECHNICAL FIELD

The present invention relates to gears and gear sets and, more particularly, a gear set configured to be rotated or propelled by electrostatic forces generated at electrodes positioned on teeth of the gears.

BACKGROUND

Conventional toothed gears and gear sets (or gear trains) may require connection to gear shaft(s) to transfer rotational motion to and from the gears. Thus, mechanical energy must be applied to a first gear in the gear set to rotate a second, meshing gear in the gear set. The need for such shafts and external sources of rotational energy may restrict the space envelope and operational environments in which a gear set may be employed.

SUMMARY

In one aspect of the embodiments described herein, a gear includes at least one gear tooth and an electrode mounted to the at least one gear tooth along a contact face of the at least one gear tooth. A flowable dielectric material is positioned on the contact face of the at least one gear tooth. The dielectric material is structured to be movable along the contact face of the at least one gear tooth responsive to a gravity force.

In another aspect of the embodiments described herein, a gear set includes a first gear including a first gear tooth and a first electrode mounted to the first gear tooth along a contact face of the first gear tooth. The gear set also includes a second gear having a second gear tooth structured to mesh with and contact the contact face of the first gear tooth along a contact face of the second gear tooth. A second electrode is mounted to the second gear tooth along the contact face of the second gear tooth. The gear set also includes a flowable dielectric material positioned on at least one of the contact face of the first gear tooth and the contact face of the second gear tooth. The dielectric material is structured to be movable along the at least one of the contact face of the first gear tooth and the contact face of the second gear tooth responsive to contact between the contact face of the first gear tooth and the contact face of the second gear tooth, and so as to remain positioned between the first electrode and the second electrode during movement of the dielectric material along the at least one of the contact face of the first gear tooth and the contact face of the second gear tooth.

In yet another aspect of the embodiments described herein, a method of applying a braking force to a pair of rotating meshed gears is provided. The pair of meshed gears includes a first gear having a first gear tooth and a second gear having a second gear tooth. The first gear tooth has a contact face, and the second gear tooth has a contact face positionable opposite the first gear tooth contact face to make contact with the first gear tooth contact face during rotation of the gears of the pair of meshed gears. The first gear tooth has an electrode mounted to the first gear tooth along the first gear tooth contact face. The second gear tooth has an electrode mounted to the second gear tooth along the second gear tooth contact face. The method includes a step of, prior to contact between the first gear tooth contact face and the second gear tooth contact face during rotation of the first gear in a first rotational direction and rotation of the second gear in a second rotational direction, energizing both the first gear tooth electrode and the second gear tooth electrode so as to produce a net charge on the first gear tooth electrode and a net charge on the second gear tooth electrode. The net charge on the first gear tooth electrode has a polarity, and the net charge on the second gear tooth electrode has a polarity the same as the polarity on the first gear tooth electrode. Energization of the first gear tooth electrode and the second gear tooth electrode generates a repulsive braking force between the first gear tooth electrode and the second gear tooth electrode as the first gear tooth contact face and the second gear tooth contact face approach each other during rotation of the gears.

DETAILED DESCRIPTION

Embodiments described herein relate to a gear set including a first gear having a first gear tooth and a first electrode mounted to the first gear tooth along a contact face of the first gear tooth. A second gear having a second gear tooth is structured to mesh with and contact the contact face of the first gear tooth along a contact face of the second gear tooth. A second electrode is mounted to the second gear tooth along the contact face of the second gear tooth. The gear set also includes a flowable dielectric material positioned on at least one of the contact face of the first gear tooth and the contact face of the second gear tooth, between the first tooth and second tooth electrodes. The dielectric material may move along the contact face as the gears rotate. The dielectric material is structured to be movable along the contact face on which it is positioned. Energization of the opposed electrodes to provide opposite net charges on the electrodes creates an attractive force between the electrodes, resulting in rotation of the gears. Energization of the electrodes also produces a separation of charges in the dielectric material positioned between the electrodes, resulting in a magnification of the attractive force. Thus, movement of the dielectric material along the contact interface between the gear teeth produces a localized, migrating region of magnified attractive force between the electrodes. In the alternative, like net charges may be generated on the electrodes to produce a repulsive force usable for braking the rotation of the gears.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 1:
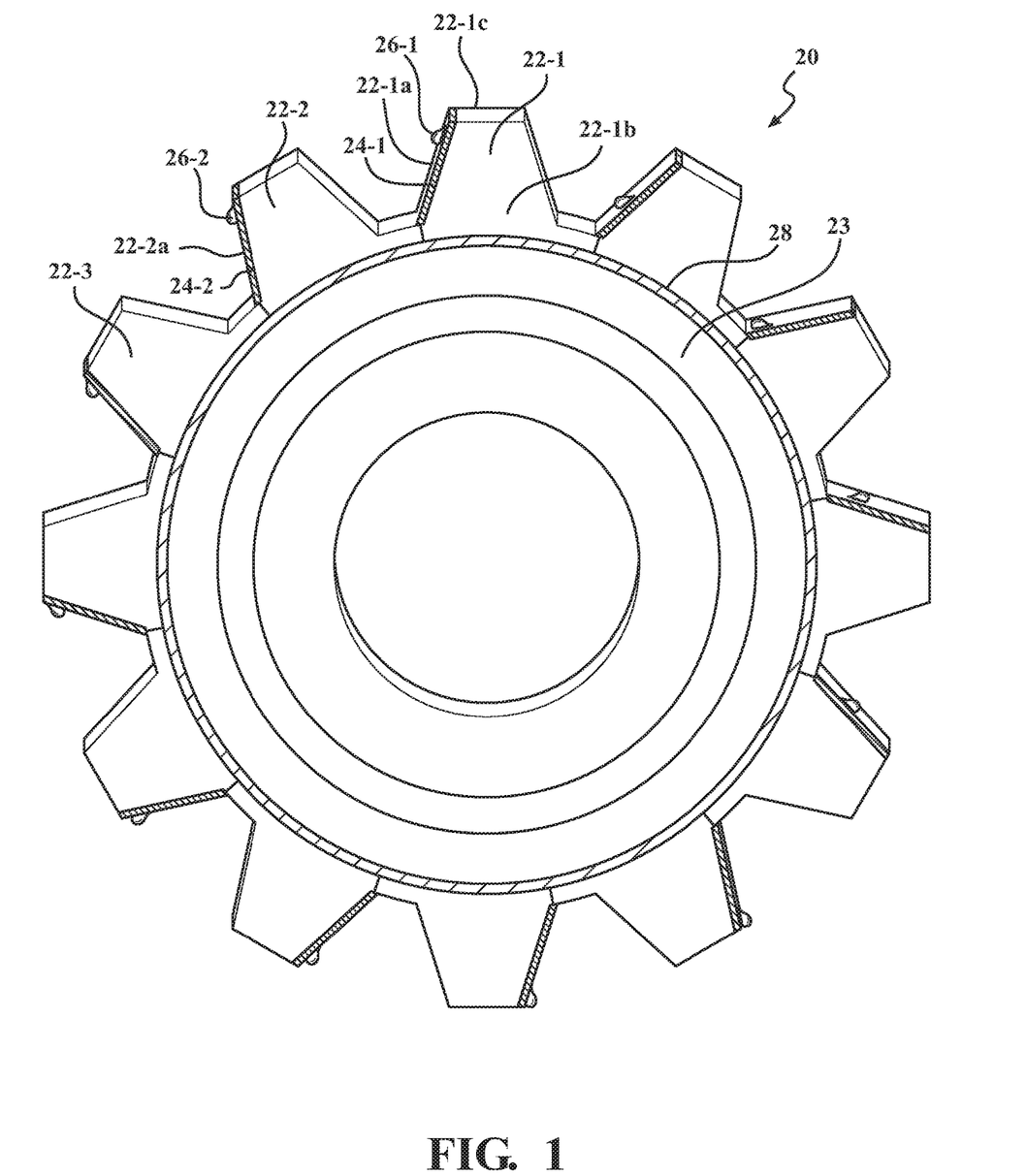
FIG. 1 is a schematic side view of an electrostatically drivable gear 20 in accordance with an embodiment described herein.

FIG. 1 is a schematic side view of an electrostatically drivable gear 20 in accordance with an embodiment described herein. In a manner described herein, timed high-voltage energization of selected electrodes formed along the gear may generate electric fields in the electrodes. These electric fields may interact with other electric fields generated exterior of the gear to produce attractive and/or repulsive forces which result in rotation of the gear. In one or more arrangements, the exterior electric fields may be generated by energizing electrodes formed along another gear structured and positioned to mesh or mate with the first gear. Suitable dielectric materials may be interposed between the electrodes to increase the generated attractive and/or repulsive forces. In this manner, the gears may be structured to be driven or rotated by forces resulting from electrostatic interactions between the energized electrodes, without the need for any conventional external mechanical driving mechanism (such as a shaft coupled to a motor, for example).

Referring to FIG. 1, in one or more arrangements, gear 20 may include at least one tooth 22-1 and an electrode 24-1 mounted to the at least one tooth 22-1 along a contact face 22-1a of the tooth 22-1. The gear embodiment shown in FIG. 1 includes multiple teeth 22 (individually designated 22-1, 22-2, 22-3, etc.) structured in the manner described herein. The electrode 24-1 extends "along" the contact face 22-1a in that it follows the contour of the contact face 22a, either as a part of the contact face or at a level slightly below the contact face (in the case of an electrode embedded in the contact face). Although characteristics of a single tooth 22-1 will be described, it will be understood that each of the other teeth on the gear 20 may have the same tooth profile and characteristics. Each gear tooth 22 may have a profile used in a standard involute gear.

The contact face 22-1a of the gear tooth 22-1 may be a surface structured to make contact (along at least a portion thereof) with a contact face of a mating, similarly structured tooth of another gear (not shown in FIG. 1) structured to mesh with the gear 20 during rotation of the gears. FIG. 1 shows an example of the contact face 22-1a of the tooth 22-1. The tooth 22-1 may have a base 22-1b (where the tooth 22-1 joins a rotational hub 23 of the gear 20) and a free end 22-1c. In one or more arrangements, the contact face 22-1a may extend between the base 22-1b and the free end 22-1c.

In one or more arrangements, the electrode 24-1 may extend along the contact face 22-1a between the base 22-1b and the free end 22-1c. The electrode 24-1 may be formed from a copper alloy or any other material suitable for the purposes described herein. The electrode 24-1 may be mounted to the tooth 22-1 so as to be close to the contact face 22-1a while preventing physical contact between the electrode 24-1 and another electrode (not shown) mounted on a contact face of a mating gear tooth (not shown) which is structured to mesh with the contact face 22-1a. For example, referring to FIG. 1A, the electrode 24-1 may be recessed in a cavity 22-1d formed in the contact face 22-1a. Depending on its thickness and the resulting effect on contact with the mating contact face, the electrode 24-1 may covered by a thin insulative layer 22-1e. Alternatively, in the case of a gear formed from a polymeric or non-conductive material, the electrode 24-1 may be embedded or molded into the gear 20 just below the contact face 22-1a. Any suitable method may be used for mounting the electrode 24-1 for the purposes described herein.

As seen in FIG. 1, the gear 20 may have a second gear 22-2 tooth formed adjacent the first gear tooth 22-1. The second gear tooth 22-2 may have a contact face 22-2a along a side of the tooth 22-2 facing in the same general direction as first gear tooth contact face 22-1a. A second gear tooth electrode 24-2 may be mounted along the second gear tooth contact face 22-2a. This distribution of electrodes on similarly-facing contact faces of consecutive gear teeth may be continued for all the teeth 22 along the entire gear 20 to provide a gear electrode arrangement as shown in FIG. 1, with an electrode mounted on the same side or contact face of each tooth of the gear.

Referring again to FIG. 1, a quantity of flowable dielectric material 26-1 may be positioned on the contact face 22-1a of the tooth 22-1. The dielectric material 26-1 may be structured to be flowable or movable along the contact face 22-1a of the tooth 22-1 between the base 22-1b of the tooth 22-1 and the free end 22-1c of the tooth. The term "flowable" means that the structure and/or application method of the dielectric material 26-1 to the contact face 22-1a may be specified so that the location of the dielectric material 26-1 is not confined to an initial location on the contact face 22-1a to which the material is applied.

In one or more arrangements, the dielectric material 26-1 may have a degree of cohesion relative to the material of the contact face 22-1a such that the dielectric material 26-1 may move along the contact face 22-1a as a cohesive, unified mass rather than spreading evenly along the contact face. In such a case, the dielectric material 26-1 may move along the contact face 22-1a responsive to the application of various forces thereto.

In one example, the dielectric material 26-1 may be structured to be movable along the contact face 22-1a responsive to a gravity force acting on the dielectric material, due to rotation of the gear 20. Thus, for example, as a tooth 22-1 rotates in a downward direction and the free end 22-1c of the tooth 22-1 moves vertically lower and lower relative to a ground surface (not shown) supporting the gear 20, a dielectric material 26-1 positioned on the contact face 22-1a of the tooth 22-1 may move closer and closer to the free end 22-1c of the tooth 22-1.

In another example (or additionally), the dielectric material 26-1 may be structured to be movable along the contact face 22-1*a* responsive to a pressure resulting from contact between the contact face 22-1*a* of the tooth 22-1 and a mating contact face (not shown) of another tooth formed on another gear. In a manner described herein, this repositionability of the dielectric material along a gear tooth may aid in dynamically adjusting attractive forces between gear teeth during rotation of the gears.

In one or more arrangements, sufficient attractive force may be generated between gears to initiate motion of the gears starting from a static or non-rotating condition. In other arrangements, sufficient attractive force may be generated between gears to maintain an existing rotation of the gears by generation of periodic force impulses as described herein to "recharge" the angular momentum of the gears.

Referring again to FIG. 1, a flowable dielectric material 26-2 may also be positioned on the contact face 22-2*a* of the tooth 22-2. Similarly, in one or more embodiments of the gear 20, a dielectric material may be positioned along each similarly-oriented contact face of each tooth 22 of the gear 20.

Energization of an electrode may involve application of a voltage or current to the electrode so as to create a net positive or negative electric charge on the electrode. In one or more arrangements described herein, electrodes may be energized by the application of a relatively high voltage (i.e., a voltage in the range 3-8 kilovolts (kV)) to the electrodes. The actual range of applied voltage may depend on the particular gear and gear system design.

Figure 1A:
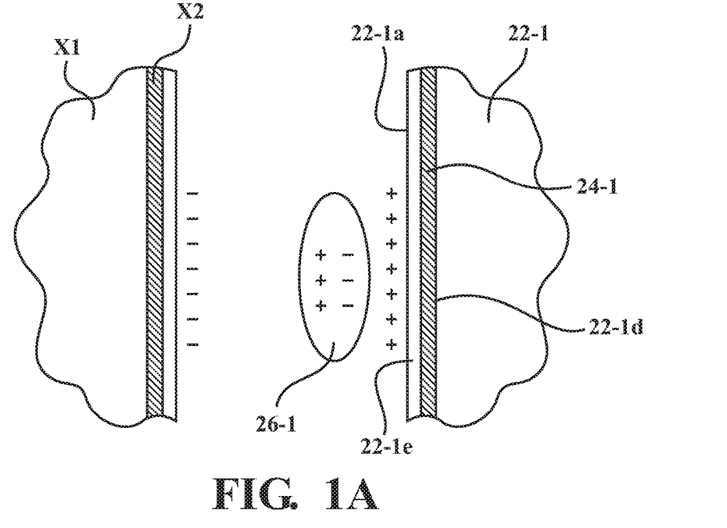
FIG. 1A is a schematic view of a portion of a gear tooth electrode energized so as to provide a net positive charge thereon, and illustrating a resulting dielectric polarization of charges within the structure of a dielectric material movably positioned along the gear tooth adjacent the electrode.

During rotation of the gear 20, the dielectric material 26-1 may move along the first gear tooth contact face 22-1*a* between the tooth base 22-1*b* and the tooth free end 22-1*c*, always residing adjacent the electrode 24-1 extending along the contact face 22-1*a*. FIG. 1A is a schematic partial cutaway view of a portion of first gear tooth 22-1 positioned adjacent another tooth X1 of another gear (not shown). The other tooth X1 may have an electrode X2 mounted thereon. As seen in FIG. 1A, when the electrode 24-1 is energized, exposure to the net charge as shown formed along the electrode 24-1 by energization may cause dielectric polarization of charges within the structure of the dielectric material 26-1. This may generate an attractive force between the dielectric material 26-1 and electrode X2 when the electrode X2 is energized with a polarity opposite that with which electrode 24-1 is energized. It has been found that, by interposing a suitable dielectric between suitably energized electrodes, the electrostatic forces generated between the opposed electrodes may be increased by up to a factor of 40×.

In one or more arrangements, flowable dielectric materials suitable for the purposes described herein may include FR3™ fluids typically used in transformers as well as silicon oils and other mineral oils with properties tailored to have the physical and electrical properties described herein.

In one or more arrangements, a flowable dielectric material suitable for the purposes described herein may have a relatively high dielectric permittivity (>3 Farads/meter).

In one or more arrangements, a flowable dielectric material suitable for the purposes described herein may have a relatively high (>25 kV) dielectric breakdown voltage.

In one or more arrangements, a flowable dielectric material suitable for the purposes described herein may have a kinematic viscosity of ≥40 mm$^2$/second.

In one or more arrangements, a flowable dielectric material suitable for the purposes described herein may have a density in the range of 0.8-0.95 gm/cc.

Referring again to FIG. 1, each electrode 24 may be structured and mounted on the gear 20 so as to be individually energizable. Each electrode on the gear may be individually electrically coupled to an energy distribution mechanism (generally designated 28) structured to enable characteristics of the electrical energy distributed to each electrode to be controlled individually using a gear control module as described herein. The energy distribution mechanism 28 may be in the form of individual conductors formed or mounted on the gear 20, with one or more of the conductors electrically coupled to an associated one of tooth electrodes 24. The energy distribution mechanism 28 may be electrically coupled to a power source 48 controlled through the gear control module 42 (described in greater detail below).

Figure 2:
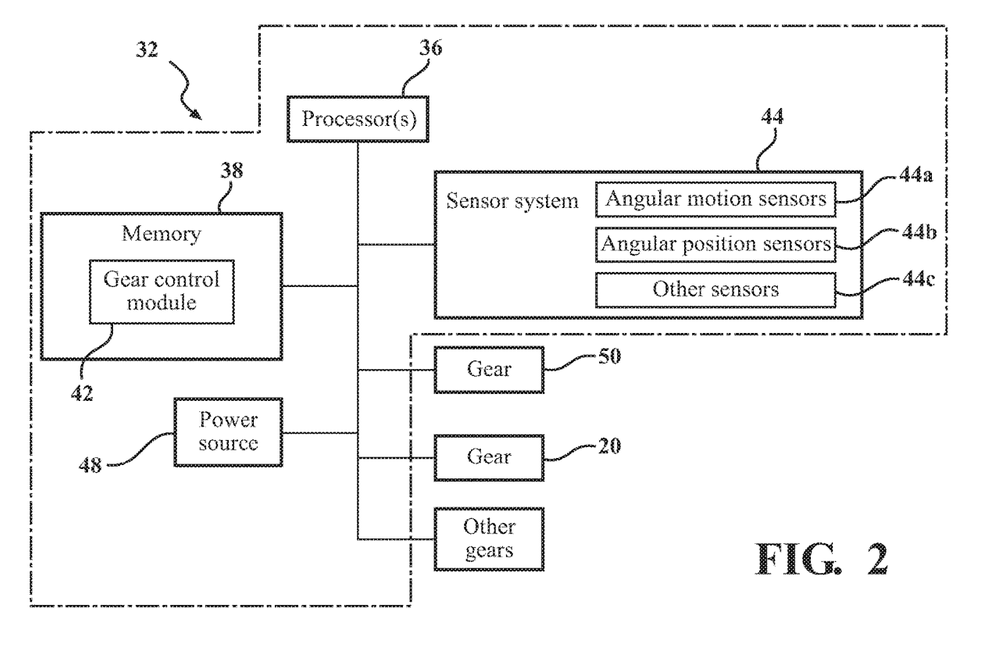
FIG. 2 is a schematic block diagram of shows one embodiment of a gear control system configured for determining and controlling, in a synchronized or coordinated fashion, the timing of energization of the gear electrodes for the purposes and in a manner described herein.

FIG. 2 is a schematic block diagram of one embodiment of a gear control system 32 configured for determining and controlling, in a synchronized or coordinated fashion, the timing of energization of the gear electrodes for the purposes and in a manner described herein.

The gear control system 32 may include one or more processor(s) 36. The processor(s) 36 may be operably connected to other elements or systems (for example, sensor system 44) for receiving information from the other elements or systems, and for issuing control commands to the other elements to control or aid in controlling operations of the gears. The terms "operably connected" and "operably coupled" as used throughout this description, can include direct or indirect connections, including connections without direct physical contact.

One or more memories 38 may be operably coupled to the processor(s) 36 for storing a gear control module 42 (described below), other modules, and any data and other information needed for diagnostics, operation, control, etc. of energization of the electrodes and/or other operations of the gears. The memorie(s) 38 may be one or more of a random-access memory (RAM), read-only memory (ROM), a hard-disk drive, a flash memory, or other suitable memory for storing the required modules and information.

Electrode energization and/or other operations relating to the gears 20, 50 may be autonomously controlled, for example, by the gear control module 42 (described in greater detail below). As used herein, "autonomous control" refers to controlling various aspects of electrode energization, gear movement and/or other operations with minimal or no input from a human operator. In one or more embodiments, the gear control system 32 is highly automated or completely automated. Generally, "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium, such as memory 38. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. Any modules described herein can be implemented as computer-readable program code that, when executed by processor(s) 36, autonomously implement various gear control functions.

Any module described herein can be a component of the processor(s) 36, or one or more of the modules can be executed on and/or distributed among other processing systems to which the processor(s) 36 is operably connected.

Any module can include instructions (e.g., program logic) executable by the one or more processor(s) 36. In one or more arrangements, one or more of the modules can include artificial or computational intelligence elements, e.g., neural network, fuzzy logic or other machine learning algorithms. Further, in one or more arrangements, the functions of one or more of the modules can be distributed among a plurality of the modules described herein. In one or more arrangements, two or more of the modules can be combined into a single module.

The gear control module 42 and/or processor(s) 36 can be configured to receive data from the sensor system 44 and/or any other type of system or element capable of acquiring information relating to the gears. In one or more arrangements, the gear control module 42 and/or processor(s) 36 can use such data in controlling any gear, gear set, or an entire gear system formed from multiple gears. The gear control module 42 can control various operations of the gears either alone or in combination with processor(s) 36.

The gear control module 42 can cause, directly or indirectly, electrode energization and other gear control functions to be implemented. As used herein, "cause" or "causing" means to make, command, instruct, and/or enable an event or action to occur or at least be in a state where such event or action may occur, either in a direct or indirect manner. The gear control module 42 can be configured to execute various vehicle control functions and/or to transmit data to, receive data from, interact with, and/or control the gears and gear control system 32 and/or one or more elements thereof.

The gear control system 32 can include a sensor system 44. The sensor system 34 can include one or more sensors. "Sensor" means any device, component and/or system that can detect, and/or sense something. The one or more sensors can be configured to detect, and/or sense in real-time. As used herein, the term "real-time" means a level of processing responsiveness that system senses as sufficiently immediate for a particular process or determination to be made, or that enables the processor to keep up with some external process or to meet some other operational requirement of the gear control system.

In arrangements in which the sensor system 44 includes a plurality of sensors, the sensors can function independently from each other. Alternatively, two or more of the sensors can work in combination with each other. In such a case, the two or more sensors can form a sensor network. The sensor system 44 and/or the one or more sensors can be operably connected to the processor(s) 36, gear control module 42 and/or another element of the gear control system. The sensor system 44 can include any suitable type of sensor. Various examples of different types of sensors are described herein. However, it will be understood that the embodiments are not limited to the particular sensors described.

In one or more arrangements, sensor system 44 may include angular motion sensor(s) 44a and/or angular position sensors 44b operatively coupled to the gears and configured to measure the angle of rotation of each gear. Additional (or alternative) sensors 44c may also be used to provide information usable to determine energization parameters (such as timing) of the various electrodes.

The gear control system 32 may include a power source 48 configured to provide any voltage and/or current necessary for energizing gear electrodes as described herein. The power source 48 may include circuitry operable or controllable by the gear control module 42 to autonomously control the magnitudes, durations, polarities, and other characteristics of any electrical energy applied to the electrodes 24, in a manner needed to operate the gears as described herein. The gear control module 42 may include instructions that when executed by the processor(s) 36 cause the processor(s) to control the timing, magnitude, polarity, and any other characteristics of any electrical energy used to energize the electrodes 24. The gear control module 42 may include instructions that when executed by the processor(s) 36 cause the processor(s) to control energization characteristics of a single electrode or multiple electrodes simultaneously.

Any suitable method and mechanism may be used to determine when each tooth of a pair of mating gear teeth is in a rotational position where an electrode mounted on the tooth should be energized or de-energized in relation to the electrode on the mating tooth. For example, angular motion and/or angular position sensors may be operatively coupled to the gears and configured to measure the angle of rotation of each gear. For operational modes where it is desired to generate attractive forces to propel the gears every time a pair of gear teeth engages, the points in gear rotation at which the electrodes should be energized may be equally spaced apart. In such cases, the gear control 42 module may include instructions that when executed by the processors cause the processors to energize the electrodes mounted on the teeth of a pair of newly engaging teeth, every time a new pair of teeth engages.

The gear control module 42 may include instructions that when executed by the processor(s) 36 cause the processor(s) to determine which pair of electrodes should be energized next during rotation of the mating gears, based on any currently energized electrodes, the directions and rates of rotation of the gears, and other factors. These electrodes may be electrodes mounted on a pair of gear teeth which will mate next as the gears rotate. The gear control module 42 may include instructions that when executed by the processor(s) 36 cause the processor(s) to energize the electrodes on the next mating pair of gear teeth, after one or more of the gears have rotated an amount equal to an angular distance separating the gear teeth and the next mating pair of gears have made contact.

The gear control module 42 may include instructions that when executed by the processor(s) 36 cause the processor(s) to deenergize the electrodes on the currently mated pair of gear teeth, after one or more of the gears have rotated a predetermined angular distance from the point of energization, for example, at a point in rotation of the gears where the currently mated pair of gear teeth disengage from each other. The gear control module 42 may include instructions that when executed by the processor(s) 36 cause the processor(s) to repeat the above steps for each successive pair of mating gear teeth.

Thus, in the manner described herein, the gear control module 42 may include instructions that when executed by the processor(s) 36 cause the processor(s) to selectively and successively energize and de-energize one or more electrodes in a coordinated fashion to generate attractive forces between pairs of gears prior to and/or during contact between the gears as described herein.

FIGS. 3A-3D show schematic side views of a contact interface of a mating gear set with gears 20 and 50 having horizontal rotational axes. Thus, in this arrangement, each gear tooth may move alternately rotationally upwardly (in direction A1) and downwardly (in direction B1) as the associated gear rotates. Therefore, a dielectric material positioned along each contact face of a tooth may tend to move along the contact face in association with the tooth movement. That is, as a tooth moves in a downward direction during gear rotation, the dielectric material positioned on the tooth may tend to move toward the free end of the tooth. Conversely, as the tooth moves in an upward direction during gear rotation, the dielectric material positioned on the tooth may tend to move toward the base of the tooth.

Figure 3A:
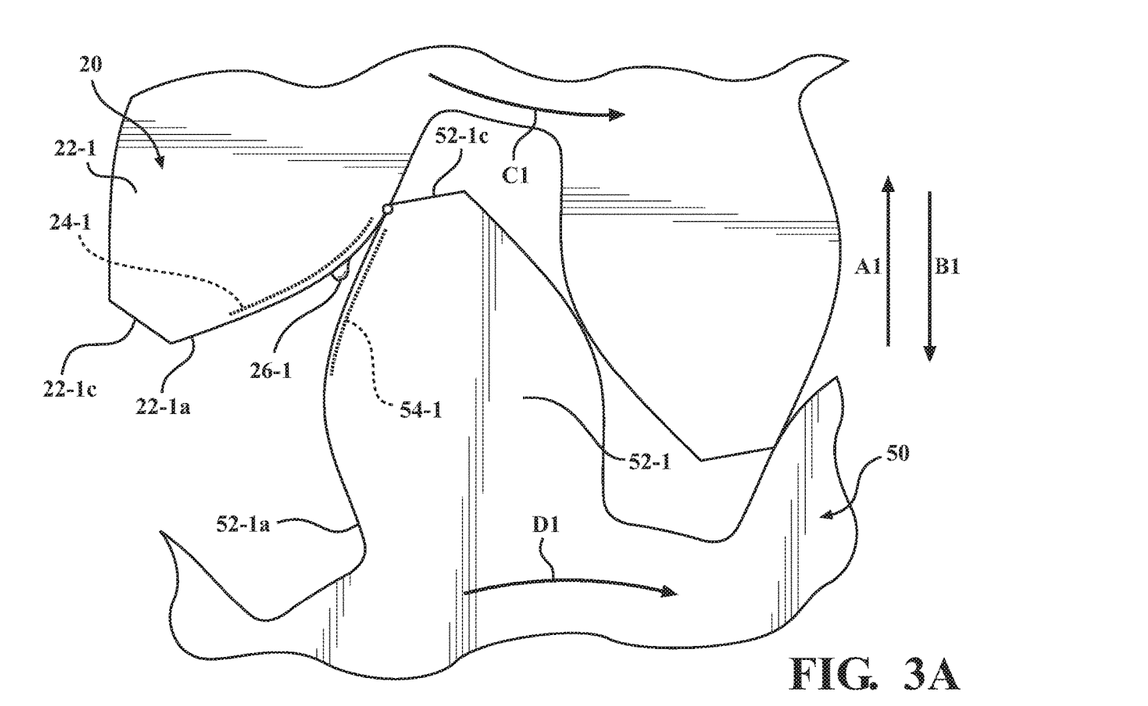
FIG. 3A is a schematic side view of a contact interface of an exemplary rotating mating gear set showing the gears just after making contact.

For example, FIG. 3A shows two mating gears 20 and 50 which are intended to rotate in directions C1 (for gear 20) and D1 (for gear 50). First gear 20 may include a first gear tooth 22-1 and a first electrode 24-1 mounted to the first gear tooth 22-1 along a contact face 22-1a of the first gear tooth 22-1. Second gear 50 may include a second gear tooth 52-1 structured to mesh with the first gear first gear tooth 22-1 to contact the first gear tooth contact face 22-1a along a contact face 52-1a of the second gear tooth 52-1, and a second electrode 54-1 mounted to the second gear tooth 52-1 along the second gear tooth contact face.

A flowable dielectric material may be positioned on at least one of the first gear tooth contact face 22-1a and the second gear tooth contact face 52-al. The dielectric material may be structured to be movable along the one of the first gear tooth contact face 22-1a and the second gear tooth contact face 52-1a responsive to contact between the first gear tooth contact face 22-1a and the second gear tooth contact face 22-1a. In the embodiment shown, the dielectric material 26-1 is positioned on the first gear tooth contact face 22-1a. In one or more arrangements, the dielectric material 26-1 may also be structured to be movable along the first gear tooth contact face 22-1a so as to remain positioned between the first electrode 24-1 and the second electrode 54-1 during movement of the dielectric material 26-1 along the first gear tooth contact face 22-1a.

Initially, first gear 20 may rotate so that first gear tooth 22-1 contacts the free end 52-1c of second gear tooth 52-1 of second gear 50 along the contact face 52-1a of tooth 52-1. Since first gear tooth 22-1 has been rotating downwardly prior to contact with second gear tooth 52-1, the dielectric material 26-1 positioned along first gear tooth 22-1 may have moved toward the free end 22-1c of the first gear tooth. Thus, when first gear tooth 22-1 contacts second gear tooth 52-1, the dielectric material 26-1 on contact face 22-1a may be positioned between electrodes 24-1 and 54-1.

At or slightly before the point in time at which first tooth 22-1 contacts tooth 52-1, electrodes 24-1 and 54-1 may be energized with opposite polarities to generate an attractive force between the electrodes. Energization of the electrodes 24-1, 54-1 also produces a separation of charges in the dielectric material 26-1 positioned on contact face 22-1a and between the electrodes, resulting in a magnification of the attractive force. This produces a region of relatively greater attractive force in the region of the dielectric material 26-1. This region of relatively greater attractive force may draw the electrodes 24-1, 54-1 toward each other, resulting in rotation of the gears in directions C1 and D1.

Figure 3B:
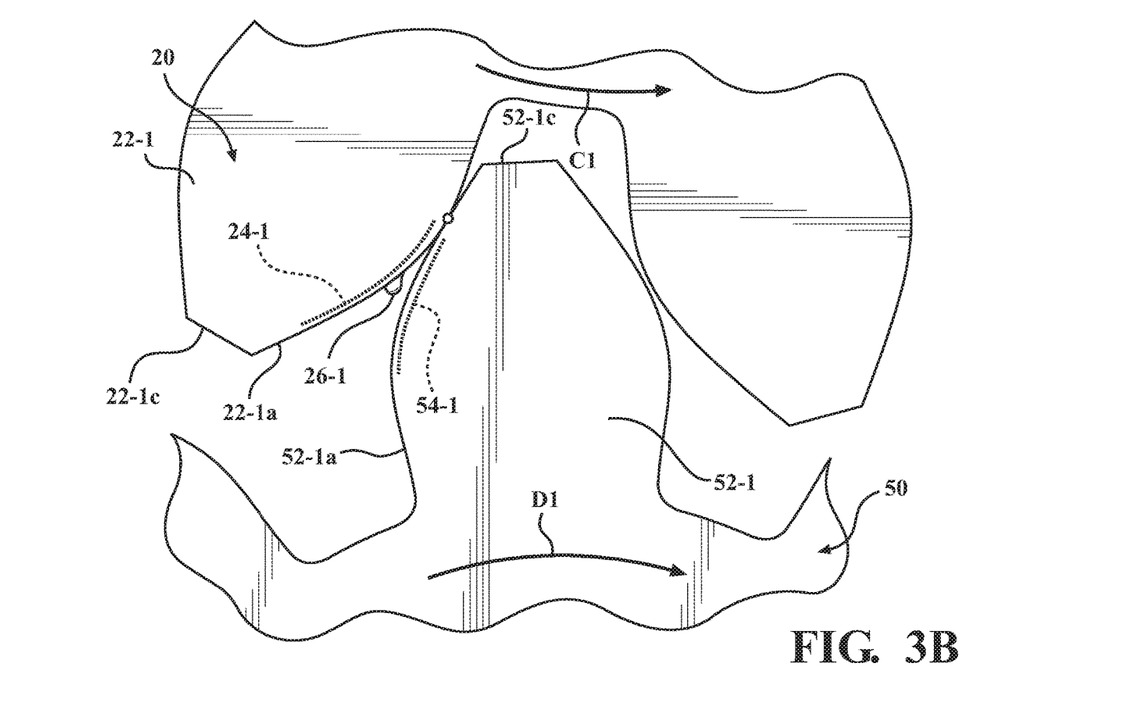
FIG. 3B is the view of FIG. 3A showing the mating gears in a later stage of rotation, and showing movement of a dielectric material along a contact face of a gear tooth.

As the gears 20 and 50 rotate, the region of contact between the contact faces 22-1a and 52-1a migrates along the contact face 22-1a toward the free end 22-1c of tooth 22-1. As a result, the movable dielectric material 26-1 on contact face 22-1a is "squeezed" or pressed by the migrating tooth contact interface, moving the dielectric material 26-1 (and the region of relatively greater attractive force) along contact face 22-1a. The dielectric material 26-1 may alternatively (or additionally) move in a direction toward tooth free end 22-1c due to the force of gravity acting on the dielectric material. In either case, the electrodes 24-1 and 54-1 may be structured and mounted on the gear teeth so that the dielectric material 26-1 remains positioned between the first electrode 24-1 and the second electrode 54-1 during movement of the dielectric material along the contact face 22-1a. Positioned thus between the electrodes, the dielectric material 26-1 may be used to magnify the forces generated between the electrodes by electrode energization.

Figure 3C:
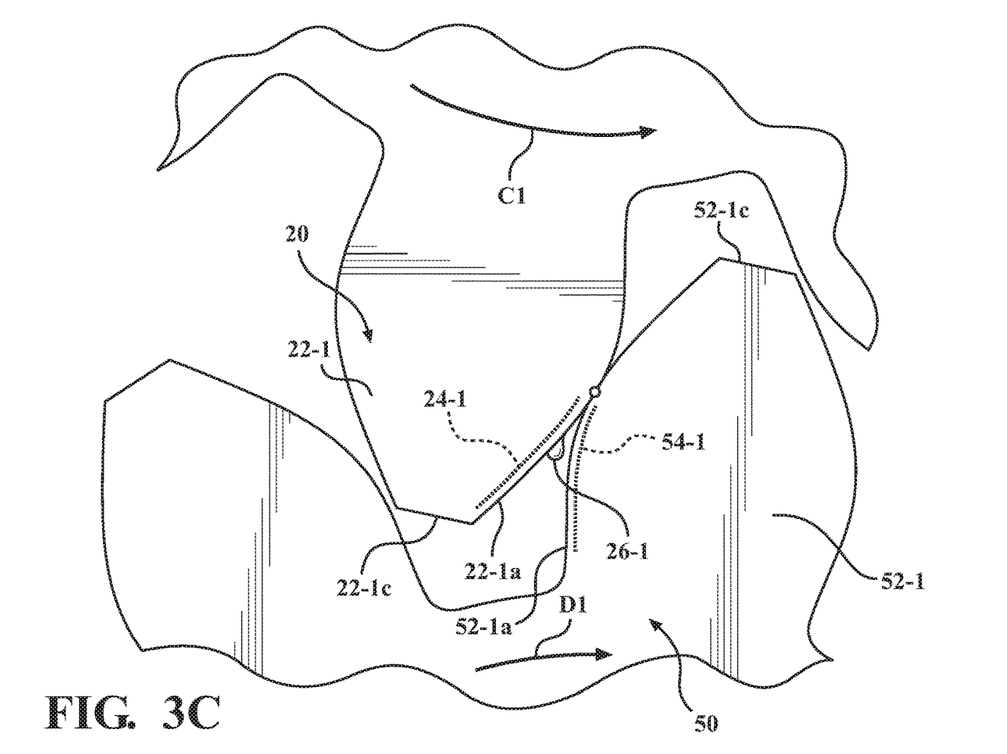
FIG. 3C is the view of FIG. 3B showing the mating gears in a still later stage of rotation, and showing further movement of the dielectric material along the contact face of the gear tooth.
Figure 3D:
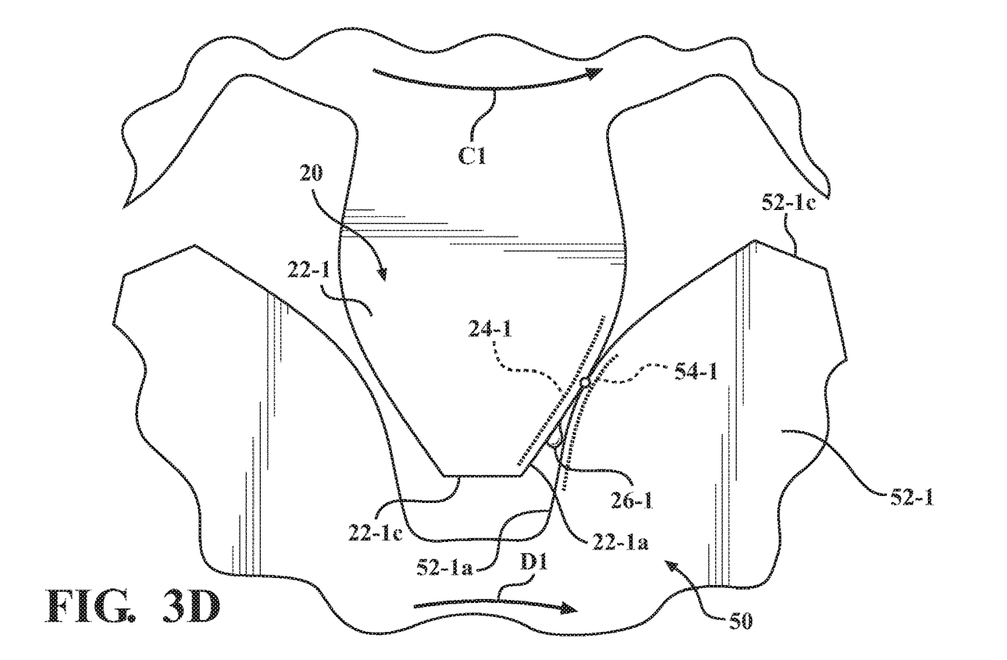
FIG. 3D is the view of FIG. 3C showing the mating gears in a still later stage of rotation, and showing further movement of the dielectric material along the contact face of the gear tooth.

Referring to FIGS. 3B-3D, as the dielectric material 26-1 (and the region of relatively greater attractive force) along contact face 22-1a migrate along the contact face, portions of the electrodes 24-1, 54-1 along opposite sides of the dielectric material 26-1 experience the greater attractive forces and are drawn toward each other, resulting in further rotation of the gears in directions C1 and D1, resulting in further migration of the dielectric material 26-1 toward free end 22-1c. This process may continue until the dielectric material 26-1 reaches the free end 22-1c of the first tooth 22-1, soon after which contact between the teeth 22-1 and 52-1 may be broken by rotation of the gears. The electrodes 24-1 and 54-1 may be de-energized at or about the time when the dielectric material reaches the free end 22-1c of the tooth 22-1. The rotational momentum produced by the process just described may cause the gears 20, 50 to rotate to a point where another tooth of first gear 20 contacts another tooth of second gear 50. Then energization of these next teeth will repeat the process just described to continue rotation of the gears.

Figure 4:
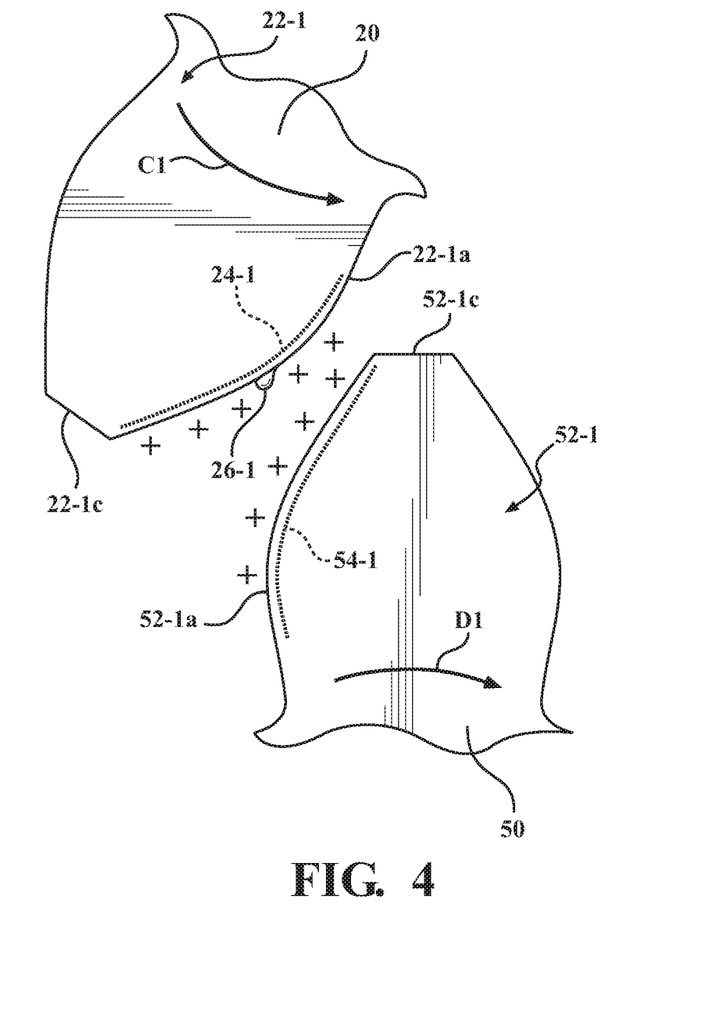
FIG. 4 is a schematic side view of a pair of mating gear teeth showing net charges on electrodes of the gear teeth directed to generation of a repulsive force between the gear teeth.

Referring to FIG. 4, in another aspect, characteristics of the gear set just described may be used to apply a braking force to slow and/or stop rotation of the gear set. Initially, the first gear 20 may be rotating in the first rotational direction C1 and the second gear 50 may be rotating in the second rotational direction D1. Referring to FIG. 4, electrodes 24-1 and 54-1 may be energized so as to provide a net charge of the same polarity on each electrode, thereby generating a repulsive force between the first gear tooth electrode 24-1 and the second gear tooth electrode 54-1 prior to the first gear tooth contact face 22-1a and the second gear tooth contact face 52-1a making contact with each other. For example, FIG. 4 shows electrodes 24-1 and 54-1 with net positive ("+") charges. Continuous application of the repulsive force on the first gear tooth electrode 24-1 may slow forward rotational motion of the first gear as the gear rotates in direction C1.

In the manner previously described, mounting of a dielectric material on at least one of the electrodes and interposed between the electrodes may magnify the generated force (in this case, a repulsive force) thereby increasing the rotational deceleration rate of the first gear. Thus, energization of the one of the first gear tooth electrode 24-1 and the second gear tooth electrode 54-1 proximate which the dielectric material 26-1 is positioned may produce a dielectric polarization of charges within the structure of the dielectric material such that a repulsive force is generated between the dielectric material and the other one of the first tooth electrode and the second gear tooth electrode when the other one of the first tooth electrode and the second gear tooth electrode is energized. However, the process for slowing rotation of a gear set may also be performed without the dielectric, by energizing the electrodes so as to provide a net charge of the same polarity on each electrode.

Figure 5A:
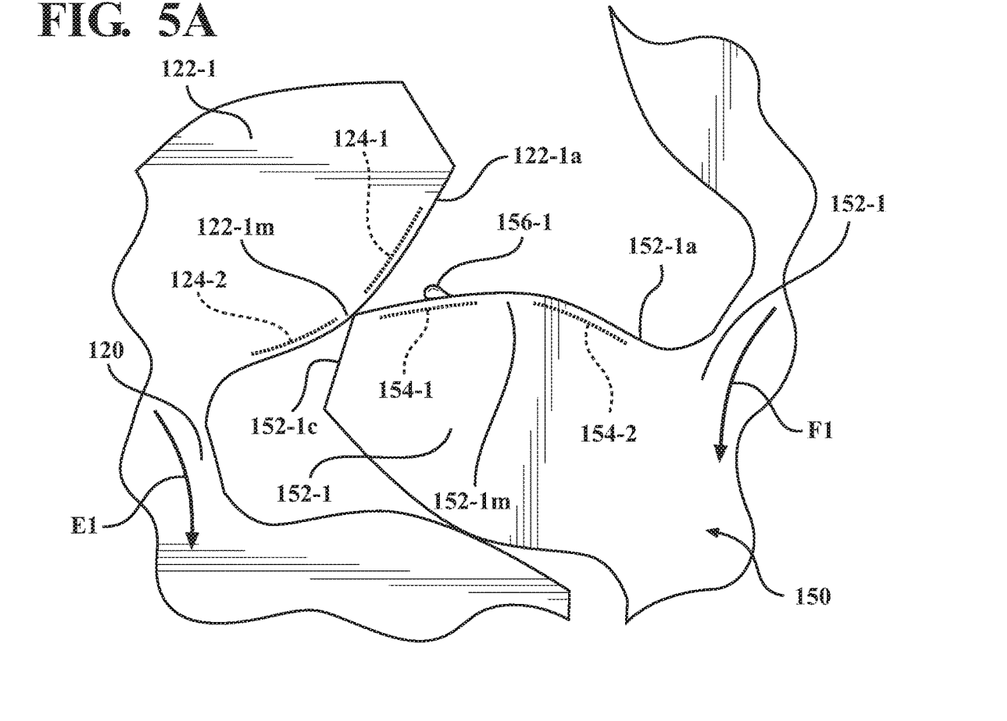
FIG. 5A is a schematic side view of portions of mating gear teeth incorporating electrodes in accordance with an alternative embodiment of the gear set, shown when the gear teeth first make contact during rotation of the gears.
Figure 5B:
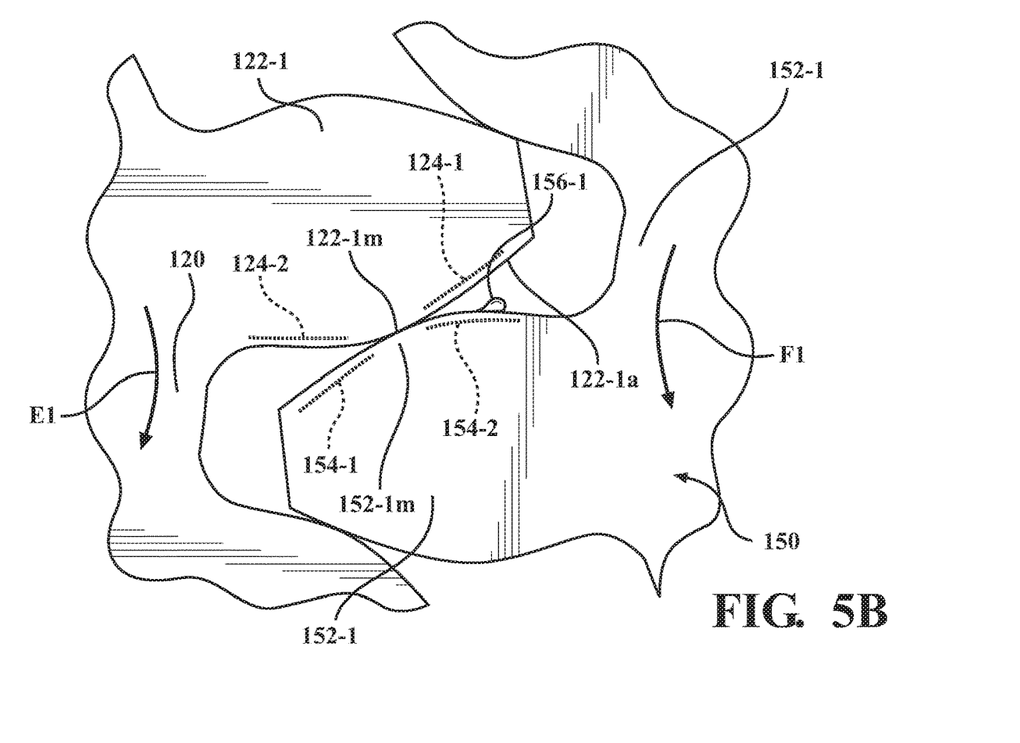
FIG. 5B is the schematic side view of FIG. 5A showing portions of the mating gear teeth in contact during a later stage of rotation of the gears.

FIGS. 5A and 5B are schematic side views of portions of mating gear teeth 122-1 and 152-1 incorporating electrodes in accordance with an alternative embodiment of the gear set. As shown in FIGS. 5A and 5B, the gear set may include a first gear 120 including a first gear tooth 122-1 and a first electrode 124-1 mounted to the first gear tooth along a contact face 122-1a of the first gear tooth 122-1. A second gear 150 may include a second gear tooth 152-1 structured to mesh with the first gear tooth 122-1 to contact the first gear tooth contact face 122-1a along a contact face 152-1a of the second gear tooth. Gear 120 may rotate in direction E1 and gear 150 may rotate in direction F1. A second electrode 154-1 may be mounted to the second gear tooth 152-1 along the second gear tooth contact face 152-1a. A flowable dielectric material 156-1 may be positioned on at least one of the first gear tooth contact face 122-1a and the second gear tooth contact face 152-1a. The dielectric material 156-1 may be structured to be movable along the one of the first gear tooth contact face 122-1a and the second gear tooth contact face 152-1a responsive to contact between the first gear tooth contact face and the second gear tooth contact face. In the embodiment shown in FIGS. 5A and 5B, the dielectric material 156-1 is positioned on the second gear tooth contact face 152-1a.

In addition, a third electrode 124-2 may be mounted to the first gear tooth 122-1 along the first gear tooth contact face 122-1a. A first insulative intermediate region 122-1m may be formed along the first gear tooth contact face between the first electrode and the third electrode. The first intermediate region 122-1m does not include an electrode and serves as a gap or boundary between the first electrode 124-1 and third electrode 124-2. A fourth electrode 154-2 may also be mounted to the second gear tooth 150-1 along the second gear tooth contact face 152-1a. A second insulative intermediate region 152-1m may be formed along the second gear tooth contact face 152-1a between the second electrode 154-1 and the fourth electrode 152-2. The second intermediate region 152-1m does not include an electrode and serves as a gap or boundary between the second electrode 154-1 and the fourth electrode 154-2. Also, as seen in FIG. 5B, the first gear 120 and second gear 150 may be structured so that the first intermediate region 122-1m and the second intermediate region 152-1m make contact with each other during contact between the first gear tooth contact face 122-1a and the second gear tooth contact face 152-1a.

The embodiment shown in FIGS. A-5B may operate in the same basic manner as the embodiment shown in FIGS. 3A-3D. In FIG. 5A. as first tooth 122-1 rotates in direction E1 and prior to (or upon) contact of first tooth contact face 122-1a with second gear tooth free end 152-1c, first gear tooth first electrode 124-1 and second gear tooth first electrode 154-1 may be energized to provide an attractive force between the electrodes. Energization of electrode 154-1 may produce polarization in the dielectric as previously described, thereby magnifying the attractive force between the electrodes and promoting the rotation of first tooth 122-1 in direction E1. As the first tooth 122-1 rotates, dielectric material 156-1 may be pressed between contact faces 122-1a and 152-1a toward second gear tooth base 152-1b. The region of enhanced attractive force migrates along contact face 152-1a, continuing the gear rotation to a point there the first intermediate region 122-1m and the second intermediate region 152-1m make contact with each other (FIG. 5B). At this point, electrode 154-1 may be de-energized and electrode 154-2 may be energized so as to generate an attractive force between electrode 124-1 and electrode 154-2. This reinforces rotation of the first gear in direction E which causes further movement of the dielectric material as previously described. The electrodes 124-1 and 154-2 may be de-energized by the gear control module when contact is broken between the teeth 122-1 and 152-1.

The provision of multiple electrodes along the contact faces may enable more precise control of the attractive and repulsive forces acting on the electrodes through selective, synchronized energization of the electrodes. That is, electrode(s) may be selectively energized which are most pertinent to generating forces between the portions of the gear teeth desired to be acted on at any given point during rotation of the gears. Electrodes which do not contribute to a desired generation of forces at any given point during the rotation may be left unenergized, thereby conserving power and helping to minimize generation of other forces which may interfere with the desired motion of the gears.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3B, but the embodiments are not limited to the illustrated structure or application.

The block diagrams in the figures illustrate the architecture, functionality, and operation of possible implementations of systems, methods, and computer program products according to various embodiments. In this regard, each block in the block diagrams may represent a module, segment, or portion of code, which comprises one or more executable instructions for implementing the specified logical function(s).

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A gear comprising:
    at least one gear tooth;
    an electrode mounted to the at least one gear tooth along a contact face of the at least one gear tooth; and
    a flowable dielectric material positioned on the contact face of the at least one gear tooth, the dielectric material being structured to be movable along the contact face of the at least one gear tooth responsive to a gravity force,
    wherein the electrode is structured to be energizeable by application of a voltage or current to the electrode so as to create a net positive or negative electric charge on the electrode.

2. The gear of claim 1 wherein the dielectric material is structured to be movable along the contact face of the at least one gear tooth responsive to a pressure caused by contact between the at least one gear tooth and another tooth of another gear.

3. A gear set comprising:
    a first gear including a first gear tooth and a first electrode mounted to the first gear tooth along a contact face of the first gear tooth; and
    a second gear including a second gear tooth structured to mesh with and contact the contact face of the first gear tooth along a contact face of the second gear tooth, and a second electrode mounted to the second gear tooth along the contact face of the second gear tooth,
    wherein the first electrode is structured to be energizeable so as to provide a net electrical charge on the first electrode having any of a first polarity and a second polarity opposite the first polarity,
    wherein the second electrode is structured to be energizeable so as to provide a net electrical charge having any of the first polarity and the second polarity on the second electrode,
    such that energization of the first electrode to one of the first polarity and the second polarity and energization of the second electrode to the other one of the first polarity and the second polarity generates an attractive force between the first and second electrodes,
    and such that energization of the first electrode to one of the first polarity and the second polarity and energization of the second electrode to the one of the first polarity and the second polarity generates a repulsive force between the first and second electrodes.

4. The gear set of claim 3 wherein the flowable dielectric material is structured to be movable along the at least one of the contact face of the first gear tooth and the contact face of the second gear tooth responsive to a gravity force.

5. A method of applying a braking force to a pair of rotating meshed gears, the pair of meshed gears including a first gear having a first gear tooth and a second gear having a second gear tooth, the first gear tooth having a contact face, the second gear tooth having a contact face positionable opposite the first gear tooth contact face to make contact with the first gear tooth contact face during rotation of the gears of the pair of meshed gears, the first gear tooth having an electrode mounted to the first gear tooth along the first gear tooth contact face, the second gear tooth having an electrode mounted to the second gear tooth along the second gear tooth contact face, the method comprising a step of, prior to contact between the first gear tooth contact face and the second gear tooth contact face during rotation of the first gear in a first rotational direction and rotation of the second gear in a second rotational direction, energizing both the first gear tooth electrode and the second gear tooth electrode so as to produce a net charge on the first gear tooth electrode and a net charge on the second gear tooth electrode, the net charge on the first gear tooth electrode having a polarity, the net charge on the second gear tooth electrode having a polarity the same as the polarity on the first gear tooth electrode, thereby generating an electrostatic repulsive braking force between the first gear tooth electrode and the second gear tooth electrode as the first gear tooth contact face and the second gear tooth contact face approach each other.

6. The method of claim 5 wherein the pair of rotating meshed gears includes a flowable dielectric material positioned on at least one of the contact face of the first gear tooth and the contact face of the second gear tooth, the dielectric material being movable so as to be positionable between the first gear tooth electrode and the second gear tooth electrode, wherein energization of the at least one of the first gear tooth electrode and the second gear tooth electrode causes a dielectric polarization of charges within the structure of the dielectric material such that a repulsive force is generated between the dielectric material and the other one of the first gear tooth electrode and the second gear tooth electrode when the other one of the first gear tooth electrode and the second gear tooth electrode is energized.

7. A gear set comprising:
  a first gear including a first gear tooth;
  a first gear tooth first electrode mounted to the first gear tooth along a contact face of the first gear tooth;
  a first gear tooth second electrode mounted to the first gear tooth along the contact face of the first gear tooth;
  a first intermediate region along the contact face of the first gear tooth separating the first gear tooth first electrode and the first gear tooth second electrode;
  a second gear including a second gear tooth structured to mesh with and contact the first gear tooth along a contact face of the second gear tooth;
  a second gear tooth first electrode mounted to the second gear tooth along the contact face of the second gear tooth;
  a second gear tooth second electrode mounted to the second gear tooth along the contact face of the second gear tooth; and a second intermediate region along the contact face of the second gear tooth separating the second gear tooth first electrode and the second gear tooth second electrode,
  wherein the first gear and second gear are structured so that the first intermediate region and the second intermediate region make contact with each other during contact between the contact face of the first gear tooth and the contact face of the second gear tooth.

8. The gear set of claim 7 further comprising a flowable dielectric material positioned on at least one of the contact face of the first gear tooth and the contact face of the second gear tooth, the dielectric material being structured to be movable along the one of the contact face of the first gear tooth and the contact face of the second gear tooth.

9. The gear set of claim 3, further comprising a flowable dielectric material positioned on at least one of the contact face of the first gear tooth and the contact face of the second gear tooth, the dielectric material being structured to be movable along the at least one of the contact face of the first gear tooth and the contact face of the second gear tooth responsive to contact between the contact face of the first gear tooth and the contact face of the second gear tooth, and so as to remain positioned between the first electrode and the second electrode during movement of the dielectric material along the at least one of the contact face of the first gear tooth and the contact face of the second gear tooth.

* * * * *